United States Patent
Shiramatsu et al.

(10) Patent No.: US 7,362,544 B2
(45) Date of Patent: Apr. 22, 2008

(54) THIN FILM MAGNETIC HEAD SLIDER, MAGNETIC HEAD SUPPORT MECHANISM, MAGNETIC DISK DRIVE, AND METHOD OF MANUFACTURING MAGNETIC HEAD

(75) Inventors: Toshiya Shiramatsu, Ibaraki (JP); Masayuki Kurita, Ibaraki (JP); Mikio Tokuyama, Ibaraki (JP); Hidekazu Kohira, Kanagawa (JP); Masahiko Soga, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 330 days.

(21) Appl. No.: 10/944,345

(22) Filed: Sep. 17, 2004

(65) Prior Publication Data

US 2005/0094316 A1    May 5, 2005

(30) Foreign Application Priority Data

Oct. 30, 2003   (JP) .............................. 2003-369912

(51) Int. Cl.
G11B 5/60     (2006.01)
G11B 15/64    (2006.01)

(52) U.S. Cl. .............................. 360/234.5; 360/234.1; 360/234.2; 360/234.3; 360/234.4; 360/128; 29/603.07; 29/603.12; 29/603.15

(58) Field of Classification Search .............. 360/234.5
See application file for complete search history.

(56) References Cited

U.S. PATENT DOCUMENTS

| | | | | |
|---|---|---|---|---|
| 5,530,604 A | * | 6/1996 | Pattanaik | 360/234.5 |
| 5,590,005 A | * | 12/1996 | Tachibana | 360/234.5 |
| 5,721,651 A | * | 2/1998 | Kitahara | 360/234.5 |
| 5,889,636 A | * | 3/1999 | Arya et al. | 360/234.5 |
| 6,188,546 B1 | * | 2/2001 | Nakajima et al. | 360/234.5 |
| 6,747,846 B2 | * | 6/2004 | Kato et al. | 360/234.5 |
| 6,813,118 B2 | * | 11/2004 | Pust et al. | 360/234.5 |
| 6,920,020 B2 | * | 7/2005 | Yamanaka et al. | 360/317 |
| 7,027,264 B1 | * | 4/2006 | Subrahmanyam et al. | 360/234.5 |
| 7,068,468 B2 | | 6/2006 | Kamajima | |
| 7,102,856 B2 | * | 9/2006 | Koide et al. | 360/234.5 |
| 7,113,369 B2 | * | 9/2006 | Ota et al. | 360/234.5 |

FOREIGN PATENT DOCUMENTS

| | | |
|---|---|---|
| JP | 02-46512 | 2/1990 |
| JP | 05-081621 A | 4/1993 |
| JP | 05-250635 A | 9/1993 |
| JP | 08-287424 A | 11/1996 |
| JP | 2003-077105 | 3/2003 |

* cited by examiner

Primary Examiner—Angel Castro
Assistant Examiner—Christopher R. Magee
(74) Attorney, Agent, or Firm—Townsend and Townsend and Crew LLP; Rambod Nader (57) ABSTRACT

A thermal flying height adjustment slider capable of being mounted on a small-sized thin film magnetic head slider is provided wherein terminals of an energizer serving as a heater prevent corrosion of pole pieces and the number of terminals is reduced. In one embodiment, one of terminals of the energizer serving as the heater is electrically connected to the lower pole piece, so that a relay terminal for a heating device is used also as the terminal for preventing the corrosion of pole pieces.

16 Claims, 13 Drawing Sheets

THIN FILM MAGNETIC HEAD SLIDER, MAGNETIC HEAD SUPPORT MECHANISM, MAGNETIC DISK DRIVE, AND METHOD OF MANUFACTURING MAGNETIC HEAD

BACKGROUND OF THE INVENTION

The present invention relates to a thin film magnetic slider for realizing high-recording density of a magnetic disk drive, a magnetic head support mechanism, a magnetic disk drive, and a method for manufacturing a magnetic head. In particular, the invention relates to a flying height adjusting slider having a function of adjusting a distance between a magnetic disk and a magnetic head.

A known disk storage unit has a magnetic disk to be rotated and a thin film magnetic head slider (hereinafter referred to as "slider") which is positioned in a radial direction of the magnetic disk. The slider has a recording/reproducing device and is supported by a magnetic head support mechanism having a suspension. The slider runs relatively above the magnetic disk to read and write magnetic information from and to the magnetic disk. The slider serves as an air lubricant bearing and flies owing to a wedge film effect of air, so that the magnetic disk and the slider are not brought into a direct solid contact with each other. In order to realize the high recording density of the disk storage unit and resulting larger capacity or downsizing of the storage unit, it is desirable to increase a linear recording density by reducing a distance between the slider and the magnetic disk, i.e., the slider flying height.

Conventionally, in designing the slider flying height, a flying height margin has been provided in view of a variation in processing, an air pressure difference depending on use environment, a temperature difference depending on use environment, and the like in order to prevent the contact of the slider with the disk even under the worst conditions. If a slider that has a function of adjusting a flying height for each head or for each use environment is realized, the above margin can be eliminated. Consequently, a flying height of the write/read device is largely reduced while the slider can be prevented from coming into contact with the disk. For example, in a known slider structure, a heating device comprising a thin film resistor is provided in the vicinity of write and read devices, and a part of a slider is heated as required to thermally expand and protrude, thereby adjusting a distance between the write and read devices and a magnetic recording medium (see, for example, Japanese Patent Laid-open No. 5-20635 (page 3 and FIG. 1)).

Conventional sliders are provided with read relay terminals for electrically connecting a magnetic read device to the external and write device terminals for electrically connecting a magnetic write device to the external. One of the sliders requires, in addition to the read device terminals (two terminals) and the write device terminals (two terminals), a pole corrosion prevention terminal (one terminal) for suppressing corrosion of a magnetic film in a solution during polishing and cleaning processes of a production process (see, for example, Japanese Patent Laid-open No. 2003-77105 (page 3 and FIG. 1)). The number of terminals in the slider requiring the pole corrosion prevention terminal is five in total.

With the installation of another terminal for a heating device which energizes and heats for the purpose of flying height adjustment, a problem of difficult mounting has been detected. The conventional slider has five terminals in total, namely, the write device terminals, the read device terminals, and the pole corrosion prevention terminal. In the case of adding the terminals for a microthermal actuator used in the heating device for the flying height adjustment, the number of terminals is increased to seven, thereby making it difficult to mount them. Because a next generation slider to which a thermal flying height adjustment slider of the present invention is applied will be further downsized, it will be even more difficult to mount seven terminals on the slider.

Further, in the case where the seven terminals are mounted on the slider, a region on which the pole corrosion prevention terminal is mounted is inevitably assigned to a position near the air bearing surface.

The known slider production process includes a polishing process for shaping the air bearing surface and a cleaning process for eliminating process residue. In this case, a protection material which is provided near the terminal is scraped off due to the polishing process, thereby undesirably exposing the pole corrosion prevention terminal. Since a brush used in the cleaning process for eliminating processing residue can often be charged, there is a risk that the pole corrosion prevention terminal is undesirably eroded due to charging at the time of contact with the brush.

BRIEF SUMMARY OF THE INVENTION

Embodiments of the present invention reduce the number of terminals of a thermal flying height adjusting slider which is provided with a heating device for energizing and heating and to enable the terminals to be mounted not only on a thin film magnetic head of the conventional size but also on a next generation small size thin film magnetic head.

In accordance with an aspect of the present invention, a thin film magnetic head slider to be used in such a fashion as to face a magnetic recording medium during flying comprises a slider substrate; a slider thin film stacked on the substrate; an energizer formed between the slider substrate and the slider thin film; a magnetic write device; and a magnetic read device. A terminal of the magnetic write device, a terminal of the magnetic read device, and a terminal of the energizer are formed on an outflow facet of the thin film magnetic head slider. The terminal of the energizer is formed from a conductive material having a higher standard electrode potential in a solution as compared with those of the magnetic write device and the magnetic read device and electrically connected to a lower pole piece of the magnetic write device or a magnetic shield of the magnetic read device.

In some embodiments, the energizer is formed between an underlying insulation film formed on the thin film magnetic head slider substrate and a lower magnetic shield of the magnetic read device formed on the underlying insulation film. Further, a relay terminal of the write device that is conductively connected to the lower pole piece of the magnetic write device is conductively connected to the wiring of the suspension and connected to a ground.

According to embodiments of the present invention, it is possible to reduce the number of terminals by one, i.e., from seven to six, by electrically connecting one of the terminals of the heating device, i.e., the energizer, of the thermal flying height adjusting slider to the lower pole piece or the shield to impart the terminal a function of a pole corrosion prevention terminal. Thus, it is possible to mount the terminals not only on the conventional slider but also on the next generation small sized slider, thereby enabling all the required electrical connections in a limited area. Further, the grounding of the pole piece enables prevention of a discharge between the slider and the disk otherwise caused by static electricity accumulated on the slider during flying, thereby achieving an effect of increasing reliability.

DETAILED DESCRIPTION OF THE INVENTION

A thin film magnetic head slider, a method of manufacturing a thin film magnetic head using the slider, and a magnetic disk drive having a magnetic head support mechanism using the slider, according to embodiments of the present invention, will hereinafter be described with reference to accompanying drawings.

Overall Magnetic Disk Drive

Figure 1:
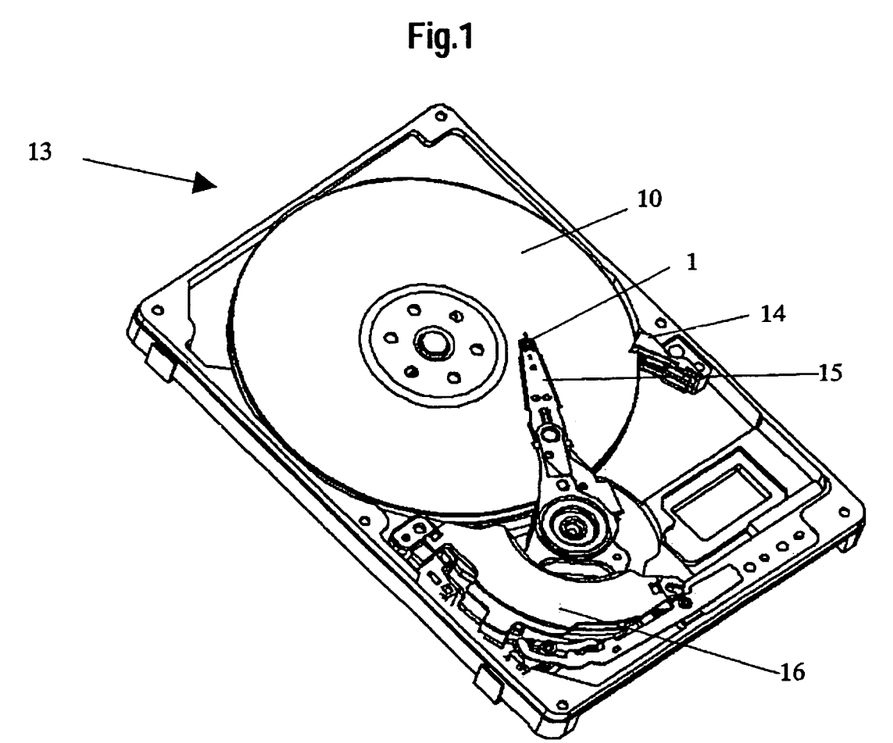
FIG. 1 is a diagram showing a magnetic disk drive using a magnetic head support mechanism on which a thin film magnetic head slider of one embodiment of the invention is mounted.

Shown in FIG. 1 is a schematic structure of a magnetic disk drive 13 according to an embodiment of the invention.

The magnetic disk drive 13 includes a magnetic disk 10 and a slider 1. The magnetic disk 10 stores magnetic information and is rotated by a spindle motor. The slider 1 having a read/write device mounted thereon is supported by a magnetic head support mechanism (load beam) 15 having a suspension and positioned in a radial direction of the magnetic disk. The slider reads and writes the magnetic information from and to the magnetic disk while flying relatively above the magnetic disk 10. The slider serves as an air lubricant bearing and flies owing to an air wedge film effect, so that the slider does not come into contact with the magnetic disk. The slider faces the rotating magnetic disk to receive an air stream at a rear end thereof. The rear end serves as an outflow facet of the slider.

In order to realize a high recording density of the magnetic disk drive and thus the increased capacity or downsizing of the disk drive, it is desirable to increase a linear recording density by reducing a distance between the slider 1 and the magnetic disk 10, i.e., a slider flying height. In recent years, the slider flying height has been reduced to about 10 nm or less.

The slider 1 is attached to the plate spring like magnetic head support mechanism (load beam) 15 having the suspension. The slider 1 receives a pressing load from the magnetic head support mechanism (load beam) toward a magnetic disk surface of disk 10. The slider 1 together with the magnetic head support mechanism (load beam) is allowed to seek in the radial direction of the magnetic disk 10 by a voice coil motor 16 to write and read information to and from the whole magnetic disk surface. The slider 1 retracts to a ramp 14 from the magnetic disk 10 while the disk drive is not in operation or in the absence of read/write command for a certain period of time.

While the disk drive having the load/unload mechanism is described above, the similar effect of the invention is also achieved in a disk storage unit of the contact start/stop type wherein a slider waits at a specific region on a magnetic disk when the disk drive is not in operation.

Slider

Figure 2:
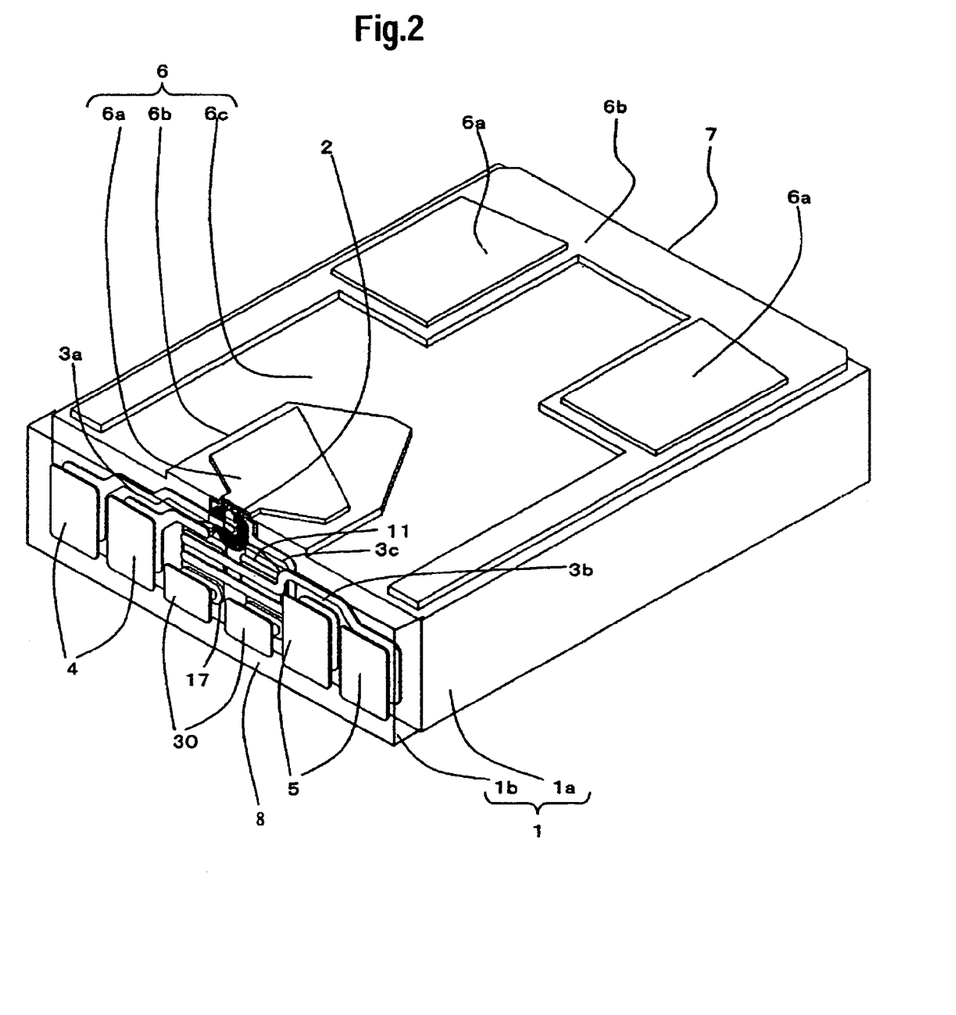
FIG. 2 is a perspective view of the slider according to an embodiment of the invention.
Figure 12:
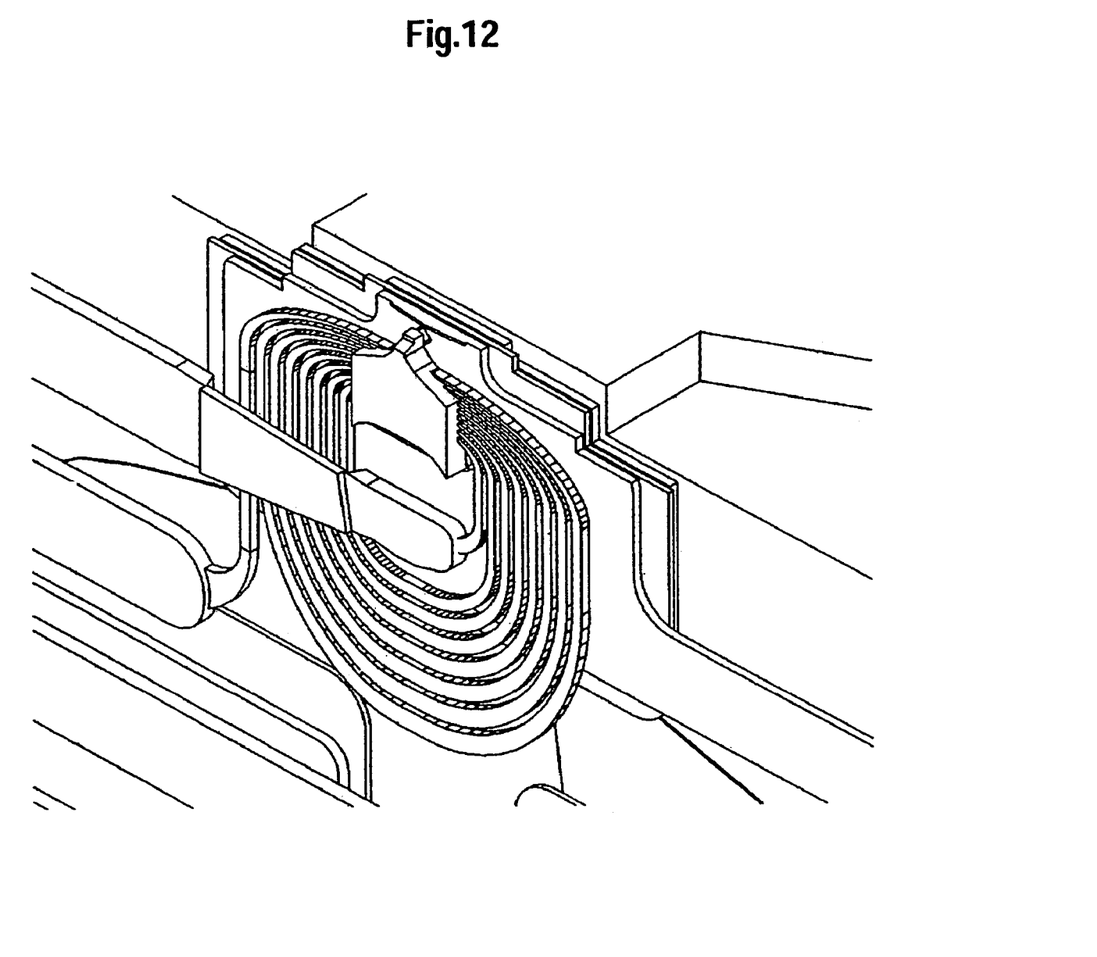
FIG. 12 is an enlarged view of a coil of FIG. 2.

An enlarged view of the slider of FIG. 1 is shown in FIG. 2, and an enlarged view of a coil unit of FIG. 2 is shown in FIG. 12. The slider 1 includes a substrate (wafer) 1a and a thin film magnetic head 1b. The substrate 1a is made from a typical material such as a sintered body of alumina and titanium carbide (hereinafter referred to as AlTiC). The thin film magnetic head 1b includes a magnetic write device (upper portion of a part denoted by numeral 2) and a magnetic read device (lower portion of the part denoted by numeral 2) formed on the substrate 1a by thin film processing; an internal metal film 3c serving as an outgoing line which is in conductive contact with the magnetic write device and the magnetic read device; write device terminals 4 for electrically connecting the magnetic write device (the upper portion of the part 2) to the external; read device terminals 5 for electrically connecting the magnetic read device (the lower portion of the part 2) to the external; an energizer 11 serving as a heating device for adjusting a flying height of a read/write device by thermally expanding and protruding a part of the slider by heating; internal metal films 17 serving as outgoing lines which are in conductive contact with the energizer 11 serving as the heating device; and terminals 30 of the energizer for electrically connecting the energizer 11 to the external.

A conventional slider is a substantial rectangular parallelepiped having a length of 1.25 mm, a width of 1.0 mm, and a thickness of 0.3 mm. In addition, the conventional slider has six faces of an air bearing surface 6, an air inflow facet 7, an air outflow facet 8, sides, and a back face. Incidentally, a next generation small size slider is further downsized in progress so as to improve positioning accuracy and reduce costs owing to mass reduction. For example, the next generation small size slider has the size of 70% of the conventional one, i.e., a length of 0.85 mm, a width of 0.7 mm, and a thickness of 0.23 mm. Fine steps are formed on the air bearing surface 6 by ion milling, etching, or other processing. The slider serves as an air bearing for supporting a load applied on its back face by generating an air pressure when facing a disk (not shown). It has been confirmed that the invention is applicable to a slider having a thickness of about 0.1 mm. Attachment and wiring are performed on the slider and the suspension, which will be described in this specification. In this case, the slider thickness of about 0.1 mm is sufficient to enable provision of a terminal having a length of about 80 μm on the outflow facet of the slider in the formation of the terminals of the suspension and the slider.

The air bearing surface 6 has the steps as described above and can be divided in three faces which are substantially parallel to one another. The three faces are a rail face 6a which is closest to the disk, a shallow groove face 6b which is a step bearing face recessed in a depth direction from the rail face by about 100 nm to 200 nm, and a deep groove face 6c which is recessed in the depth direction from the rail face by about 1□m. When the air stream caused by the disk's rotation enters the rail face 6a via the shallow groove face 6b which is the step bearing, it is compressed by the tapered passage to produce a positive air pressure. In turn, when the air stream enters the deep groove face 6c via the rail face 6a or the shallow face 6b, it encounters the broaden passage to produce a negative air pressure. Incidentally, the depths of the grooves are exaggerated in FIG. 2.

The slider 1 is designed to fly in such a fashion as to make a flying height at an air inflow end 7 larger than that at an air outflow end 8. Accordingly, a distance between the air bearing surface and the disk is smallest at a position near the air outflow end. Since in the vicinity of the air outflow end the rail face 6a protrudes toward the shallow groove face 6b and the deep groove face 6c which surround the rail face 6a, a distance between the rail face 6a and the disk becomes smallest unless the slider pitch attitude and roll attitude are declined to a degree exceeding a certain limit. The magnetic read/write device 2 is formed on a region of the rail face 6a, the region belonging to the thin film head 1b. The shape of the air bearing surface 6 is so designed as to maintain a distance between the magnetic read/write device 2 and the disk to an appropriate value, i.e., about 10 nm, by bringing the load applied by the magnetic head support mechanism (load beam) and the positive/negative air pressures generated on the air bearing surface 6 into a good balance.

The above-described slider has the air bearing surface 6 which is the two-step bearing type air bearing surface consisting of the three types of faces 6a, 6b, and 6c which are substantially parallel to one another. However, the effect of the invention can be achieved by using a slider having a step bearing type air bearing surface consisting of four or more parallel faces.

Thin Film Head Structure

Figure 3:
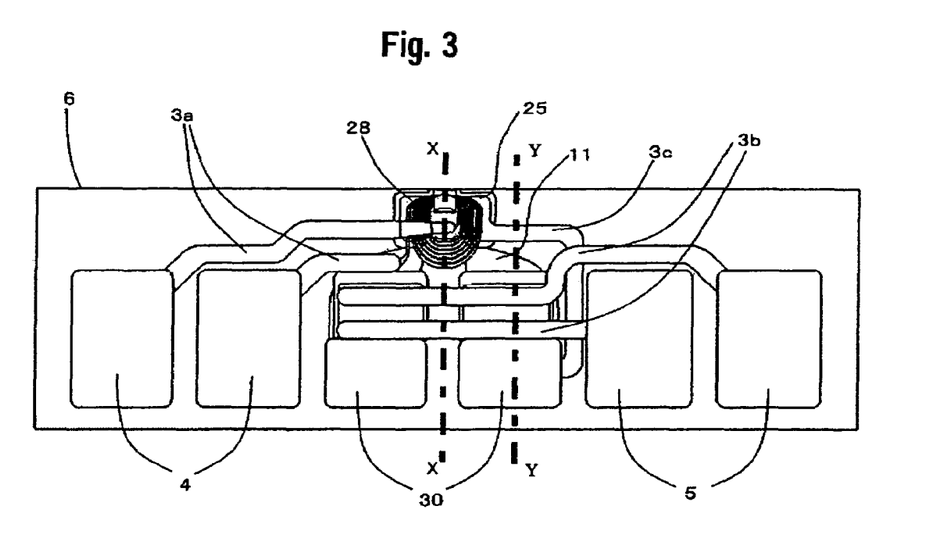
FIG. 3 is an end view showing the air outflow facet of the slider according to the embodiment of the invention.
Figure 4:
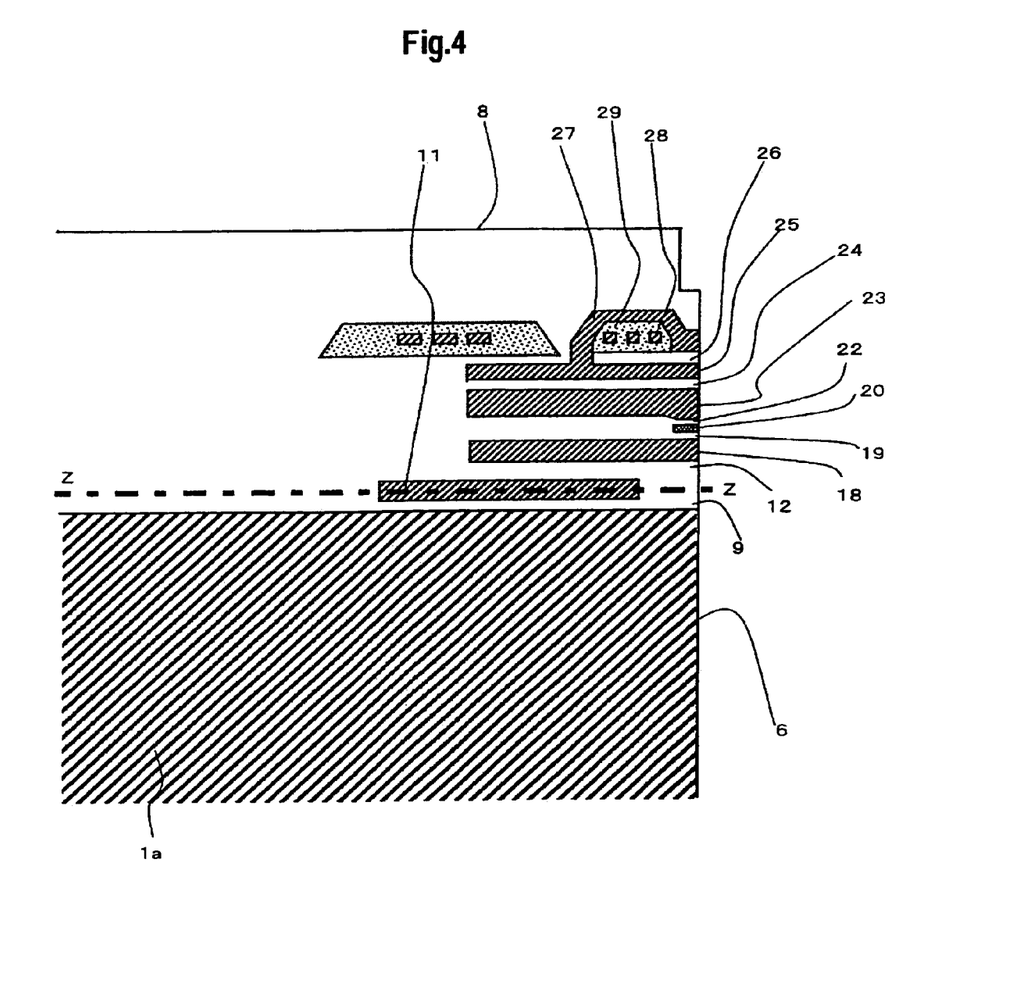
FIG. 4 is an enlarged cross-sectional view of the slider according to the embodiment of the invention taken along line X-X of FIG. 3.
Figure 5:
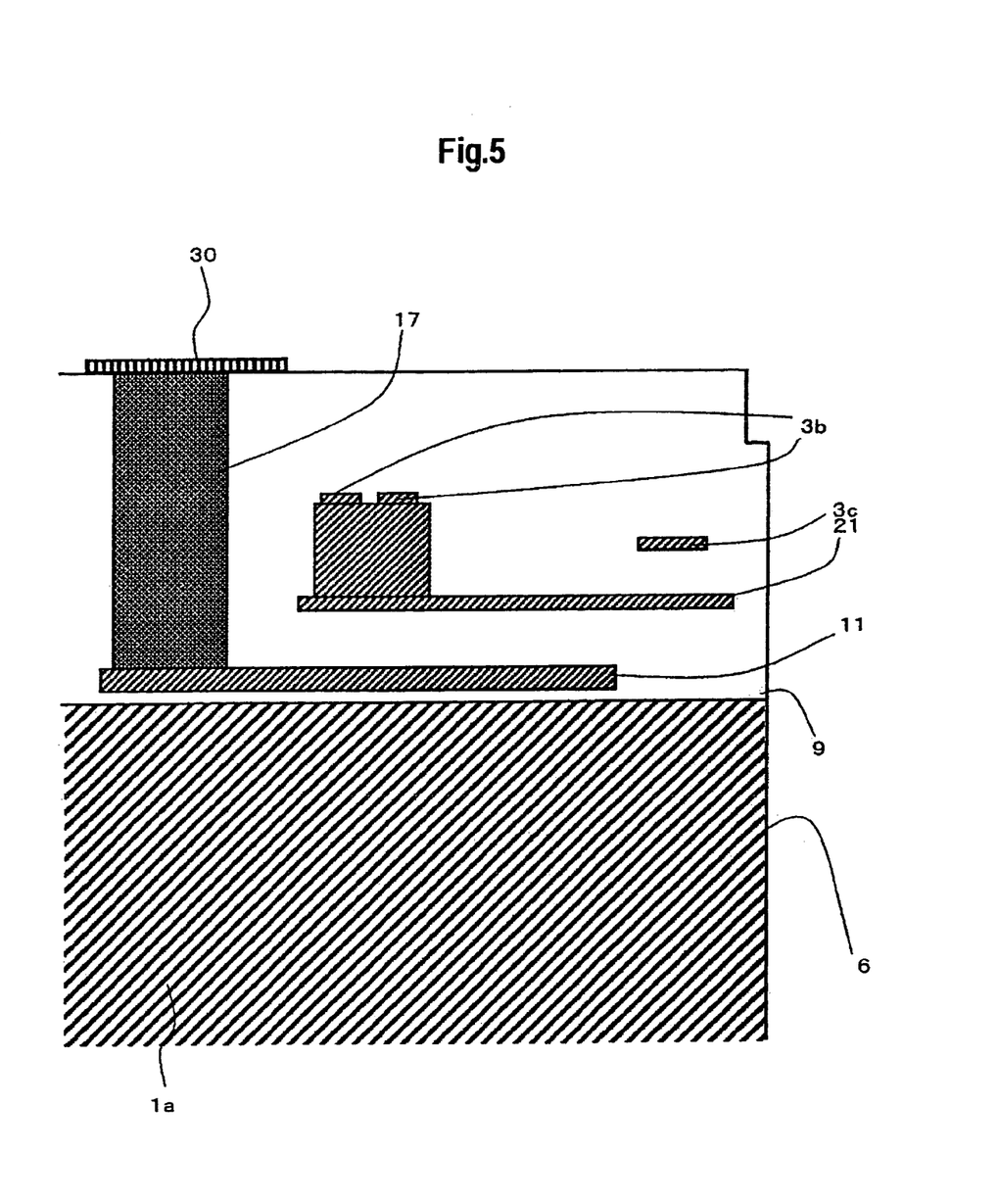
FIG. 5 is an enlarged cross-sectional view of the slider according to the embodiment of the invention taken along line Y-Y of FIG. 3.
Figure 13:
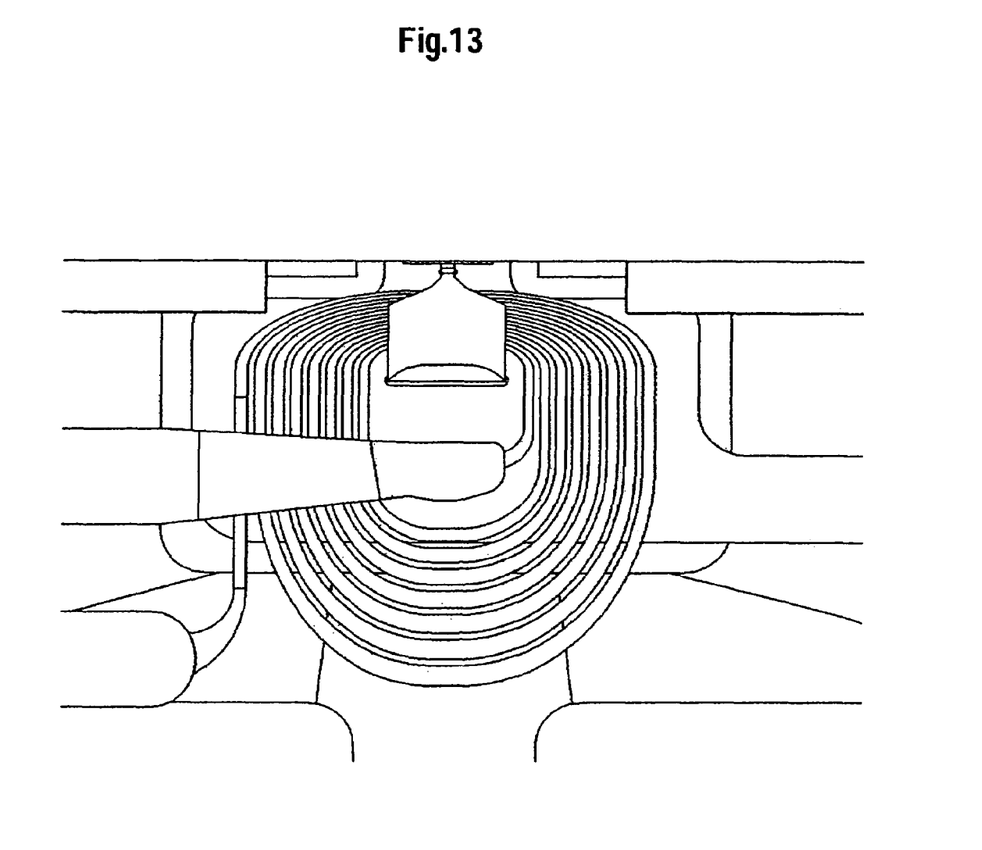
FIG. 13 is an enlarged view of a coil of FIG. 3.

FIG. 3 is a view of the slider of FIG. 2 as viewed from the air outflow end; FIG. 4 is an enlarged view of the thin film head 1b having the magnetic write device 2a and the magnetic read device 2b, showing a section taken along line X-X of FIG. 3; and FIG. 5 is a sectional view taken along line Y-Y of FIG. 3. FIG. 13 is an enlarged view of a coil shown in FIG. 3. This embodiment will be described in detail with reference to FIGS. 2, 3, 4, and 5.

In the manufacturing processes of the magnetic head manufacturing method according to an embodiment of the invention, an underlying insulation film 9 is formed on the substrate 1a, and then the energizer 11 formed from permalloy as an energizer serving as a heating device is formed on the underlying insulation film 9. In addition, an insulating layer 12 made from alumina or the like is formed on the energizer 11. Then, the internal metal films 17 withdrawn from the energizer serving as the heater are formed. A detailed description of the energizer serving as the heater will be given later in this specification.

Next, a lower shield film 18, and a lower gap film 19 made from alumina or the like, are formed on the insulating layer 12. Then a magnetoresistive element 20 (hereinafter referred to as "MR element"), which is the magnetic read device, and a pair of electrodes 21 for extracting a magnetic signal of the MR element 20 are formed. Then, an upper gap film 22 made from alumina or the like and an upper shield film 23 are formed, followed by forming an upper shield insulating film 24 made from alumina or the like. Then, a lower pole piece 25 of the magnetic write device is formed on the upper shield insulating film 24, followed by forming the internal metal film 3c withdrawn from the lower pole 25 to make conductive connection with one of the internal metal films 17 withdrawn from the energizer 11 serving as the heating device to the lower pole 25. Then, a magnetic gap film 26 made from alumina or the like and an upper pole piece 27 of the magnetic write device are formed. Next, a coil 28 for supplying a current for generating a magnetic field on the upper pole piece 27 and an organic insulating film 29 are formed. Then, read lines 3b withdrawn from the electrodes 21 coupled to the MR element 20 and write lines 3a withdrawn from the coil 28 are formed. Then, a protection insulating film (slider thin film head) 1b made from alumina or the like for protecting and insulating the thus-obtained components is formed in such a fashion as to cover the overall components. Lastly, write device terminals 4 for inputting a current externally to the coil 28 and read device terminals 5 for sending the magnetic signal to the external are formed. Simultaneously, terminals of the energizer are formed. A material used for forming the terminals of he energizer is a metal or a ceramic having a higher standard electrode potential in a solution used in the later process steps of polishing and cleaning the air bearing surface as compared with a CoNiFe alloy which is a part of the materials used for forming the lower pole piece 25 and the upper pole piece 27, such as Au, Ag, Pt, Ru, Rh, Pd, Os, Ir, and like metals or a material (metal, alloy, or compound, for example) selected from the group consisting of conductive ceramics such as Al2O3TiC, SiC, TiC, WC, and B4C. The terminals of the energizer serving as the heater are in conductive contact with the pair of internal metal films 17 withdrawn from the energizer with which the lower pole piece 25 is in conductive contact via the internal metal film 3C, which input a current externally to the energizer.

An area of each of the terminals 30 of the energizer is made larger than a sectional area, on the air bearing surface, of the lower pole piece 25 or the upper pole piece 27 of the magnetic write device.

As described above, the lower pole piece 25 and the upper pole piece 27 which must be prevented from being eroded in the later process steps are brought into conductive contact with the energizer terminals 30. The energizer terminals 30 has a potential higher than the standard electrode potential in a solution of the CoNiFe alloy, for example, which is part of the materials used for the lower pole piece 25 and the upper lower piece 27. The above conductive contact can cause a standard electrode potential in the solution of the lower pole 25 and the upper pole 27 to shift to a passive state region after the conduction with the energizer terminals 30. Consequently, corrosion of the lower pole 25 and upper pole 27 is suppressed. Thus, the energizer terminals 30 achieve an effect of preventing the corrosion of the pole pieces.

Figure 6:
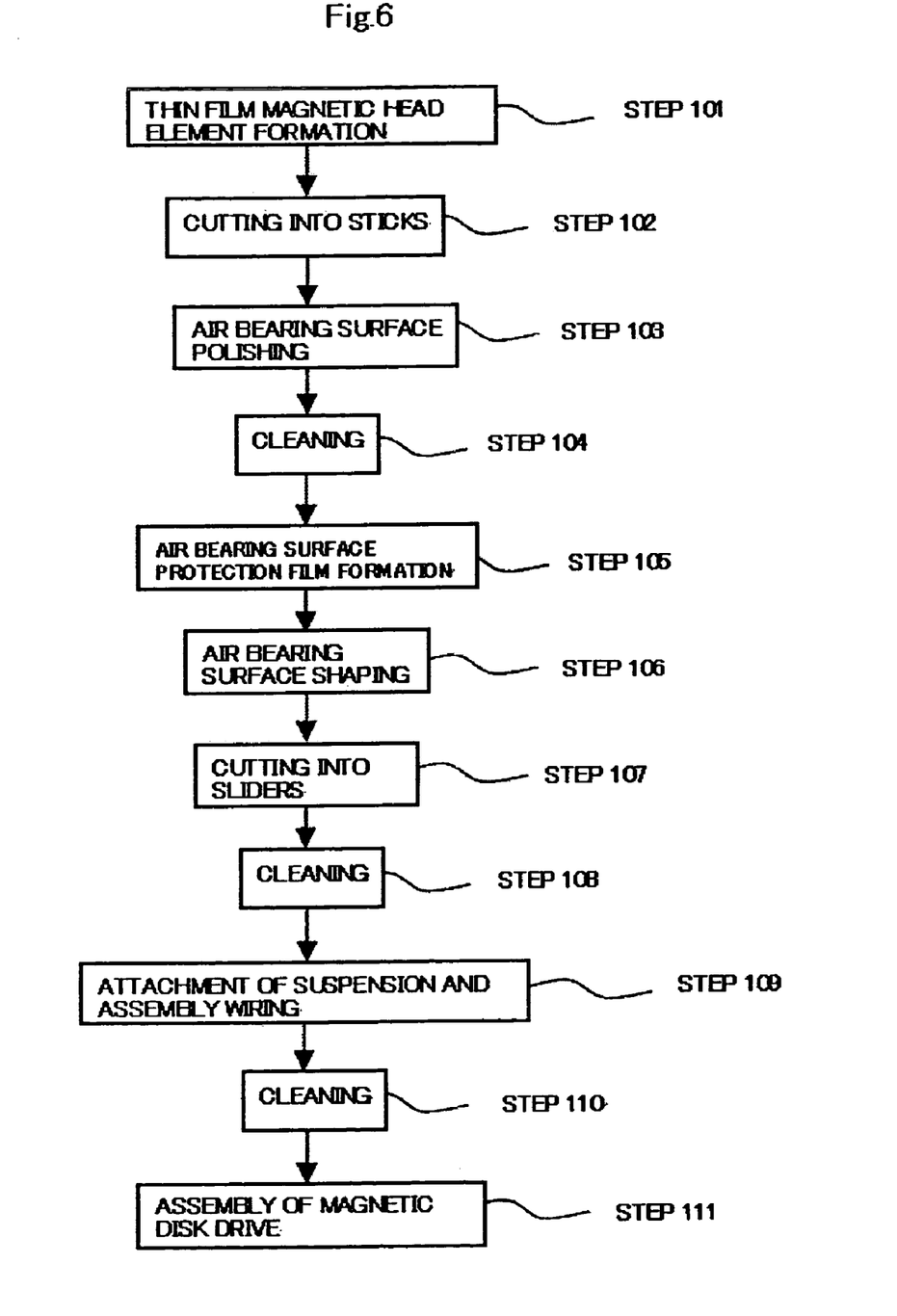
FIG. 6 is a flowchart showing a production process of the thin film magnetic head and the magnetic disk drive according to an embodiment of the invention.

Steps of the production process of the magnetic disk drive of present embodiment will hereinafter be described with reference to FIG. 6. As described above, a plurality of thin film magnetic heads 1b are formed simultaneously on the slider substrate 1a (Step 101), and then the substrate 1a is cut into sticks by a machining process (Step 102). Then, an air bearing surface 6 is formed by polishing a cut surface of each of the bars (Step 103), followed by cleaning (Step 104).

A carbon protection film having a thickness of a several nanometers is formed on the air bearing surface 6 so as to prevent abrasion thereof even if the bearing surface 6 comes into a short-time slight contact with a disk, as well as to prevent corrosion of the thin film components in the air bearing surface (step 105). A rail face 6a, a shallow groove face 6b, and a deep groove face 6c of the air bearing surface are formed in order to stabilize the slider (Step 106), and then the thin film magnetic heads cut into sticks are cut into individual pieces (Step 107). Another cleaning is performed (Step 108) to complete a thin film magnetic head slider 1. After the completion, the slider is attached to a suspension which is a part of a magnetic head support mechanism, and then wiring assembly is performed (Step 109), followed by another cleaning (Step 110). Lastly, the magnetic disk drive is assembled (Step 111). It was confirmed that the terminals 30 of the energizer are preferably electrically insulated from, i.e., not in a conductive connection with, a stainless steel underlayer of the suspension in Step 110 by allowing the terminals to float electrically. The reason for the insulation is that, when the terminals 30 of the energizer, which are wiring connected to the pole pieces, are in conductive connection with the stainless steel, the different metals form a closed circuit when they contact the solution to cause corrosion in some cases. Further, in a thin film magnetic head wherein an upper shield film is used also as a lower pole piece, the above effect is achieved by forming the internal metal film 3c by withdrawing the internal metal film 3c from the upper shield film in such a fashion as to conductively contact with the upper shield.

Reason for Using Terminals of Energizer Serving as Heating Device as Pole Corrosion Prevention Terminal The terminals of the energizer are less harmful to the lower pole piece even if they are electrically connected to the lower pole as compared with the terminals of the write device and the read device. The reasons for this advantage are as follows. No charge is applied to the lower pole piece since the energizer terminals are electrically connected to the earth in addition to the lower pole; and, since it is possible to increase the thickness of the insulating film between the shield and the energizer so as to eliminate discharge between the energizer and the shield, the read device is not influenced adversely by the connection between the energizer and the lower pole piece. When the terminals of the write device and the read device are connected to the lower pole in order to impart thereto the corrosion prevention function, such connection may cause application of charge to the pole piece and the read device to deteriorate the read/write characteristics. Therefore, the relay terminals of the heating device are most suitably used as the relay terminals having the function of pole corrosion prevention.

Grounding of One of Terminals of Energizer to be Used as Heating Device

As described in the foregoing, the write device writes magnetic information by generating a magnetic field between the lower pole piece 25 and the upper pole piece 27 using the current flowing the coil; therefore, it is necessary to prevent the current to be input to the heating device 11 from being applied to the pole pieces. Accordingly, it is necessary to connect one of the terminals 30 of the energizer, to which the lower pole piece 25 is conductively connected via the internal metal film 17 withdrawn from the energizer serving as the heating device, to the ground via the wiring of the suspension. By thus keeping a potential of the pole forcibly at zero, discharge between the slider and the disk due to static electricity accumulated on the slide during flying can be prevented, producing an effect of increasing reliability.

Figure 7:
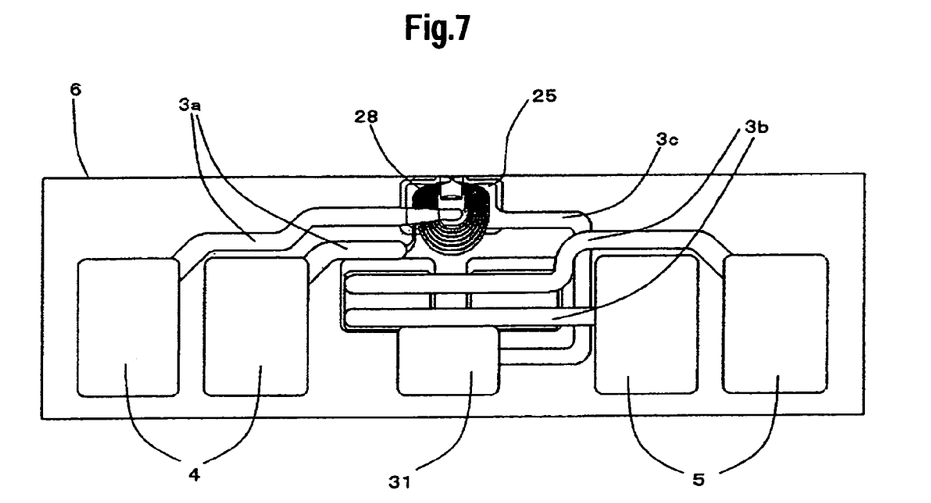
FIG. 7 is a diagram illustrating a discharge prevention structure.

In another embodiment of the invention, a relay terminal for preventing the charging of a head and the discharge to a disk is provided on the slider without provision of the heating device for flying height adjustment. Such a configuration is shown in FIG. 7. A relay terminal for discharge prevention 31 is connected to the lower pole piece 25 and the suspension wiring through a gold ball, solder, or the like and grounded during operation to maintain a potential of the pole piece at zero.

Energizer Serving as Heater

Figure 8:
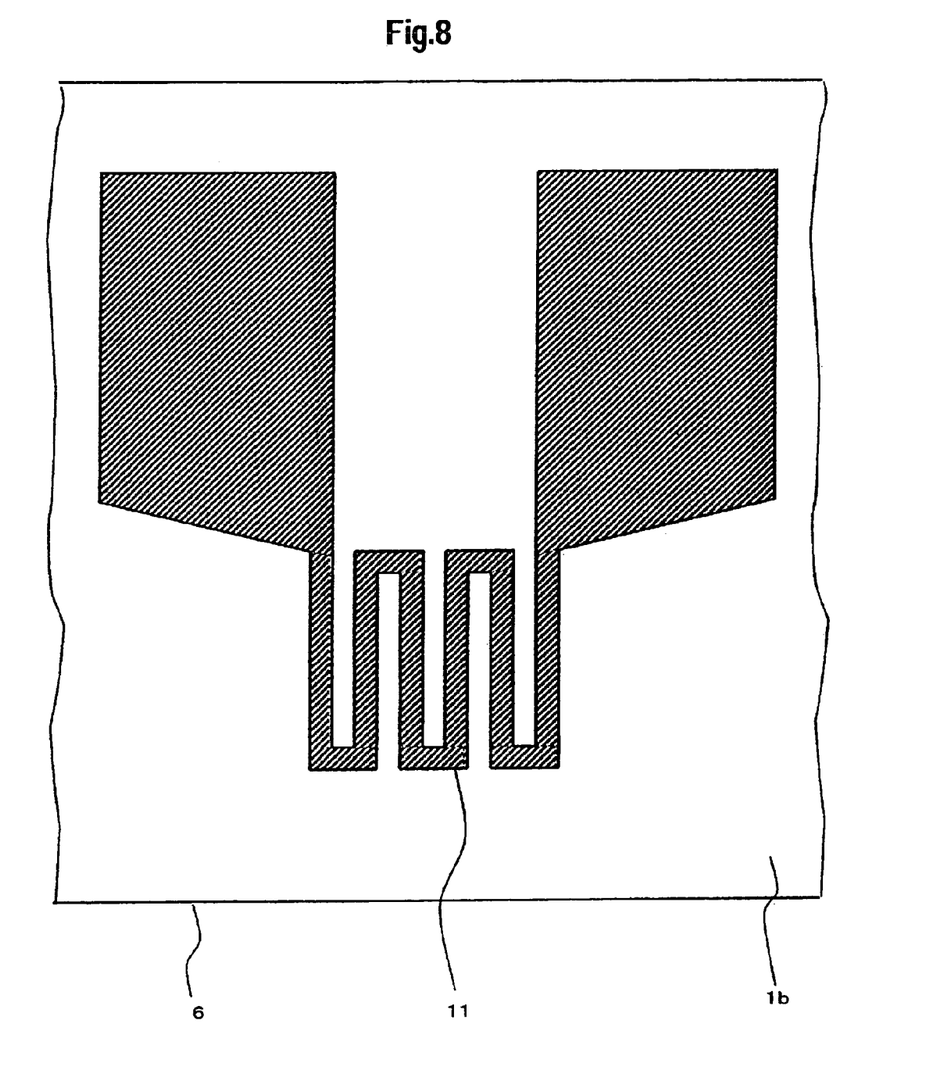
FIG. 8 is a cross-sectional view taken along line Z-Z of FIG. 3.

In the vicinity of the read/write device, the energizer 11 as a heater using a thin film resistor is formed by employing thin film processing as shown in FIG. 4. In this embodiment, a thin line made from permalloy and having a thickness of about 0.5 μm and a width of about 4.5 μm is provided on a region having a depth of about 60 μm and a width of about 60 μm in a meandering manner. In addition, a gap is filled with alumina to form the energizer which is the thin film resistor serving as the heater. A resistance value is about 50Ω. FIG. 8 is a cross-sectional view of the energizer 11 as viewed from the outflow end, taken along line Z-Z of FIG. 4.

Order of Terminals and Wirings

It is desirable to place the terminals of the energizer serving as the heater on the center or edges of the slider from the following reasons. The wiring from the six terminal for write/read devices are bonded to a wiring pad formed on a suspension gimbal. The wiring is divided into two sets in such a fashion that three pieces of wiring pass on one of arms of the gimbal and the other three pieces of wiring pass on the other arm of the gimbal. Then the two sets of the wiring meet again to become six pieces of wiring. The six pieces of wiring are routed around a root of the suspension. In this case, the pieces of wiring having passed on the center of the slider are placed at the outer part of the suspension and the other pieces of wiring having passed on the edges of the slider are placed on the center of the suspension. It is necessary to reduce the wiring spacing when placing six pieces of wiring on a region for four pieces of wiring, but, with such reduced wiring spacing, the wiring can be influenced by noise during passing through between the write current and the read current. In this embodiment, since one of the terminals of the energizer serving as the heater is conductively connected to the lower pole piece, it is desirable to allow the wiring for the energizer to be less susceptible to the effect of noise. Accordingly, the terminals of the energizer are wired either on the center of the slider and the outermost part of the suspension or on the ends of the slider and the center of the suspension, thereby minimizing the possibility that the pole piece is influenced by the noise.

Flying Height Adjustment Method

Hereinafter, a method of adjusting a flying height according to one embodiment of the invention will be described.

A flying height adjustment procedure can generally be divided into three steps: a step during designing, a step during inspection before delivery, and a step during operation. In the step during designing, a slider of the lower limit of variation is designed to come into contact with a disk under the conditions of the highest possible ambient temperature, the lowest possible air pressure, and continuous writing. That is to say, the slider is designed under the conditions of the conventional slider design without flying height adjustment. A difference between the highest ambient temperature and the lowest ambient temperature is relatively large in a magnetic disk drive for mobile appliances. On the other hand, a flying height is reduced relatively greatly due to a thermal protrusion caused by heating of a magnetic pole during continuous writing in a magnetic disk drive for servers. Thus, the designing conditions vary depending on the appliance to be used.

Figure 9:
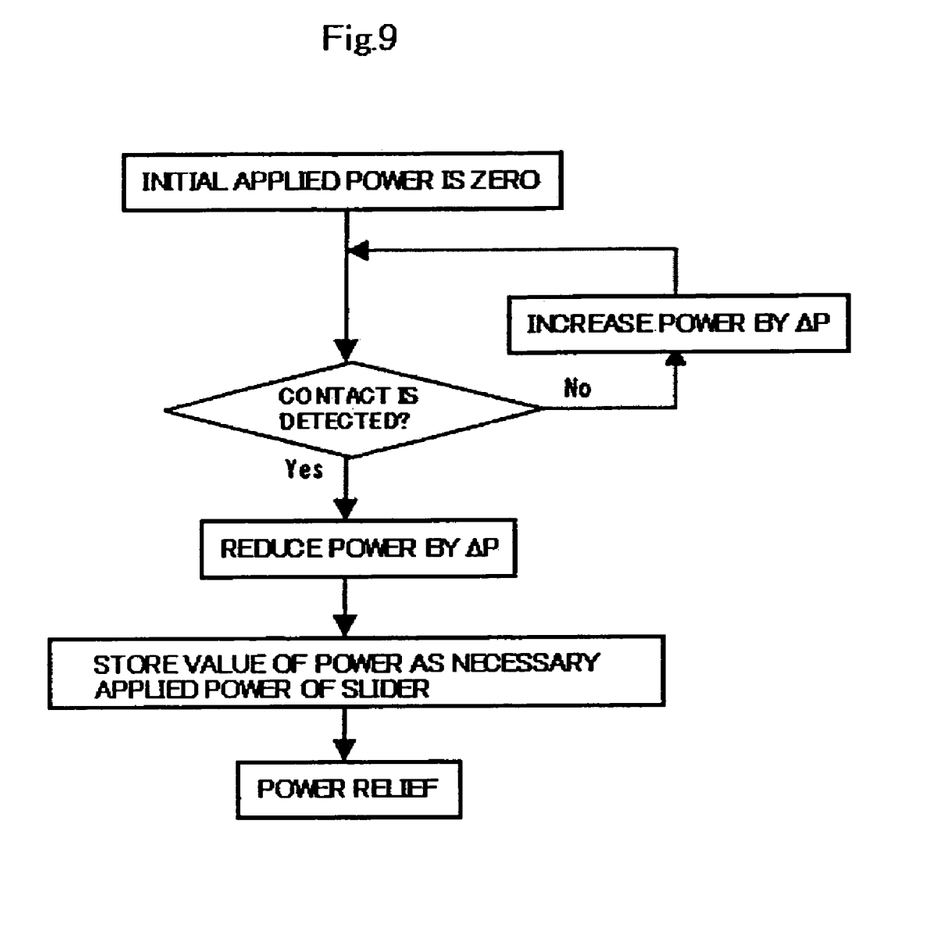
FIG. 9 is a flowchart showing a flying height inspection method.

In the step during inspection before delivery, a flying height of each of sliders is inspected and stored in a memory. The method of inspecting the flying height is specifically shown in FIG. 9. Since an amount of flying height adjustment is in proportion to supplied power, power to be applied is initially set to zero and then gradually increased until detection of contact of the slider with the disk. The flying height of the slider is calculated from the applied power at the time of the contact and the coefficient of proportion between the amount of flying height adjustment and the supplied power. A method of the detection of the contact of the slider with the disk will be described later in this specification. In addition, it is possible to further improve accuracy of the flying height adjustment by storing not only a difference between inner and outer peripheries but also the variation in slider flying height.

In the step during operation, or basically in the case where a client such as a computer issues a read/write command, power corresponding to a flying height of the slider is supplied to a selected active head. No power is supplied to the heads in an idling state. The power to be supplied to the active head is reduced in the case of continuous writing as well as of the highest ambient temperature, and increased in the case of the lowest ambient temperature by the use of the coefficient of proportion between the amount of flying height adjustment and the supplied power.

Simplest Basic Adjustment Algorithm

Figure 10:
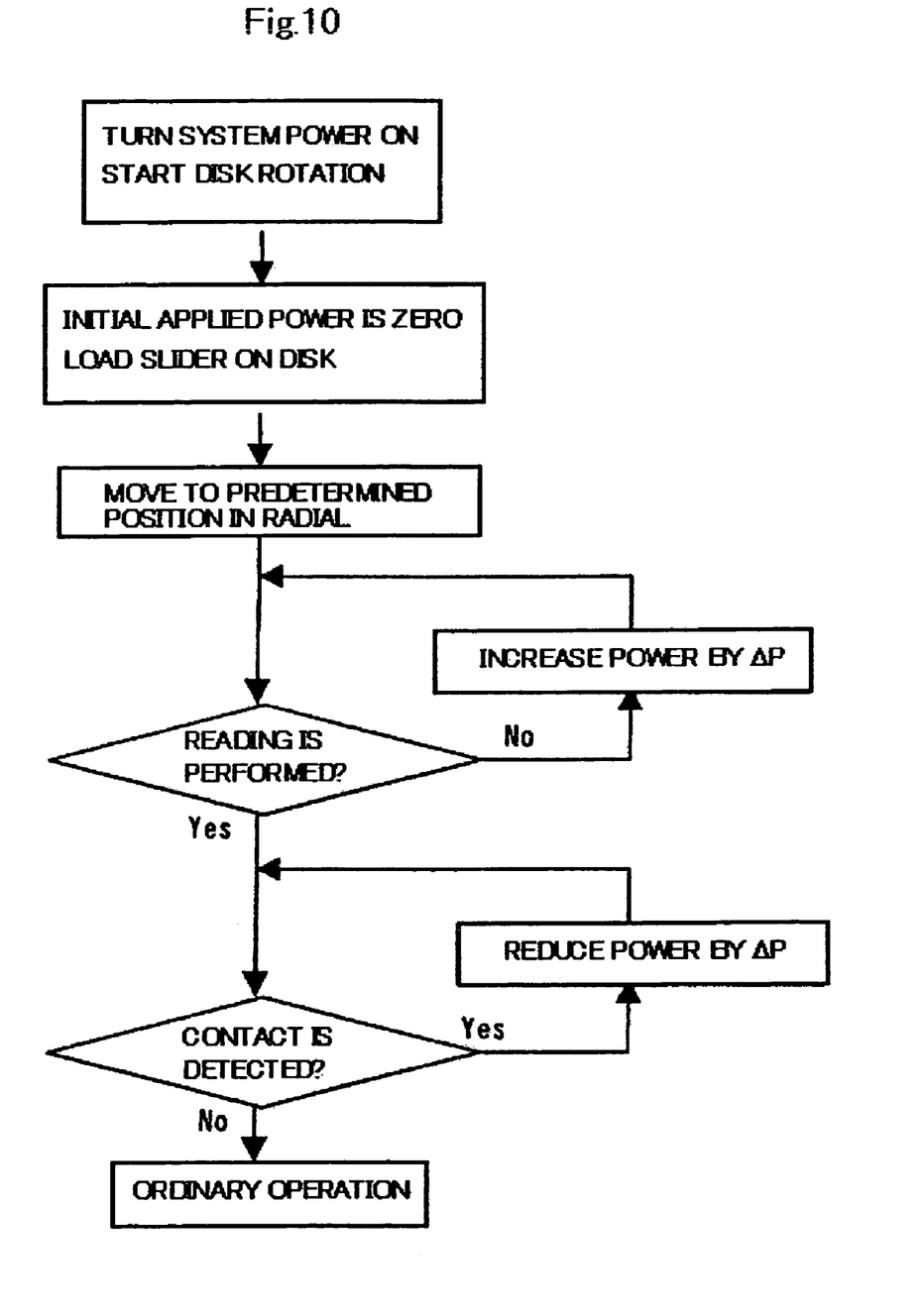
FIG. 10 is a flowchart showing a flying height adjustment method.

The basic control algorithm is shown in FIG. 10. A sensor for measuring an air pressure and a temperature may additionally be used in other methods, but, in the simplest control method, a feedback control is performed so as to control power to be input to the heating device only when a contact or an read error occurs. This is because it is not problematic so far as conditions of no contact (not in the state of a too short distance) in the state where influences of the air pressure, the temperature, the individual difference are input and no error (not in the state of a too long distance) in reading magnetic information are satisfied. In order to prevent the component from being damaged due to impact of loading, it is effective to keep the flying height relatively high without energizing the energizer serving as the heating device when loading the slider above the disk, particularly when activating the drive. A method of detecting the contact will be described later in this specification.

The compensations for the flying height fluctuations caused by the air pressure difference and the head individual difference are performed only at the activation as shown in the drawing; however, it is necessary to monitor the contact and the read error at a predetermined interval or during operation in order to compensate for the flying height fluctuation caused by the temperature difference. Therefore, in the case of the magnetic disk drive to be used in an appliance having a relatively large temperature fluctuation during operation, it is effective to compensate for the flying height fluctuation at a predetermined interval or during operation.

Ambient temperature information can be obtained by a temperature sensor that is an accessory of the drive, which makes it possible to provide a flying height adjustment having a high degree of accuracy.

Contact Detection Method

Known contact detection methods include (1) a method using an acoustic emission (AE) sensor, (2) a method of monitoring thermal asperity which is noise included in a read signal due to heating by contact, and (3) a method of monitoring an off-track signal (position error signal) which is generated when off-track occurs due to slider's minute rotation about a pivot caused by contact-frictional force.

The detection of the read error of magnetic information can sufficiently be achieved by monitoring the so-called bit error rate. It is difficult to monitor a write error unlike the read error; however, since the flying height during writing is generally lower than that caused during the reading by the expansion of the device caused due to heating by the coil, the possibility of the write error is low under the conditions where the read error does not occur.

As another method relating to the flying height adjustment, a method of observing in place a distance between the read device and a medium by the use of amplitude of the read signals is known. It is possible to apply this method to the detection method.

System Constitution

Figure 11:
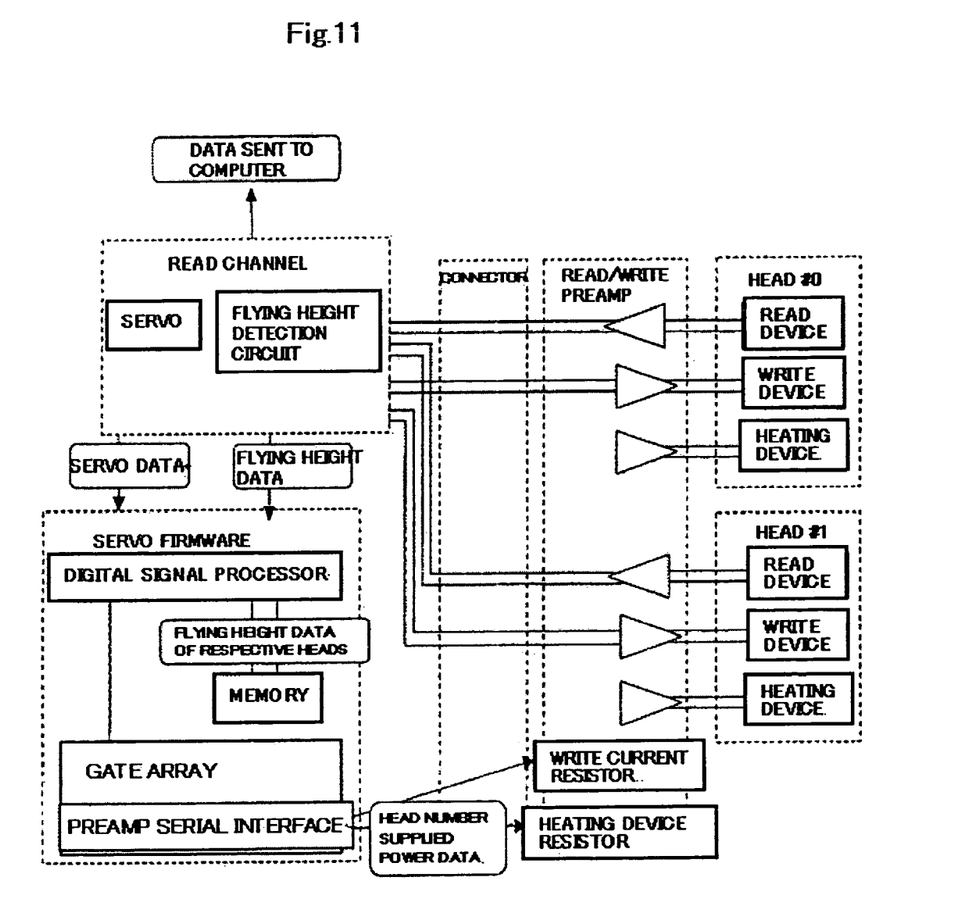
FIG. 11 is a diagram showing a system constitution of the magnetic disk drive according to an embodiment of the invention.

Shown in FIG. 11 is a system constitution of a disk storage unit having the function of flying height adjustment according to an embodiment of the invention. In this drawing, the energizer serving as the heater is shown as a heating device.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A thin film magnetic head slider to be used in such a fashion as to face a magnetic recording medium during flying, comprising:
   a slider substrate supported by a suspension having wiring;
   a slider thin film stacked on the substrate;
   an energizer formed between the slider substrate and the slider thin film;
   a magnetic write device; and
   a magnetic read device;
   wherein a terminal of the magnetic write device, a terminal of the magnetic read device, and a terminal of the energizer are formed on an outflow facet of the thin film magnetic head slider;
   wherein the terminal of the energizer is formed from a conductive material having a higher standard electrode potential in a solution as compared with potentials of the magnetic write device and the magnetic read device, and is electrically connected to a lower pole piece of the magnetic write device or a magnetic shield of the magnetic read device; and
   wherein a relay terminal of the magnetic write device which is conductively connected to the lower pole piece, is conductively connected to the wiring of the suspension and connected to a ground.

2. A magnetic head support mechanism comprising the thin film magnetic head slider according to claim 1.

3. A magnetic disk drive comprising the magnetic head support mechanism according to claim 2.

4. The thin film magnetic head slider according to claim 1, wherein the thin film magnetic head slider has a thickness ranging from about 0.10 mm to about 0.23 mm.

5. A magnetic head support mechanism comprising the thin film magnetic head slider according to claim 4.

6. A magnetic disk drive comprising the magnetic head support mechanism according to claim 5.

7. The thin film magnetic head slider according to claim 1, wherein the energizer is formed between an underlying insulation film formed on the thin film magnetic head slider substrate and a lower magnetic shield of the magnetic read device formed on the underlying insulation film.

8. The thin film magnetic head slider according to claim 7, wherein the thin film magnetic head slider has a thickness ranging from about 0.10 mm to about 0.23 mm.

9. A magnetic head support mechanism comprising the thin film magnetic head slider according to claim 8.

10. A magnetic disk drive comprising the magnetic head support mechanism according to claim 9.

11. A thin film magnetic head slider to be attached and wired to a suspension and used in such a fashion as to face a magnetic recording medium during flying, comprising:
   a slider substrate;
   a slider thin film stacked on the substrate;
   an energizer formed between the slider substrate and the slider thin film;
   a magnetic write device having a lower pole piece; and
   a magnetic read device;
   wherein a terminal of the magnetic write device, a terminal of the magnetic read device, and a terminal of the energizer are formed on an outflow facet of the thin film magnetic head slider; and
   wherein a relay terminal of the write device which is conductively connected to the lower pole piece of the magnetic write device is conductively connected to the wiring of the suspension and connected to a ground.

12. A magnetic head support mechanism comprising the thin film magnetic head slider according to claim 11.

13. A magnetic disk drive comprising the magnetic head support mechanism according to claim 12.

14. The thin film magnetic head slider according to claim 11, wherein the thin film magnetic head slider has a thickness ranging from about 0.10mm to about 0.23mm.

15. A magnetic head support mechanism comprising the thin film magnetic head slider according to claim 14.

16. A magnetic disk drive comprising the magnetic head support mechanism according to claim 15.

* * * * *